US011190642B1

(12) United States Patent
Yanes et al.

(10) Patent No.: US 11,190,642 B1
(45) Date of Patent: Nov. 30, 2021

(54) SYSTEMS AND METHODS FOR ROUTING INCOMING CALLS

(71) Applicant: Fuze, Inc., Boston, MA (US)

(72) Inventors: Leopoldo E. Yanes, Boston, MA (US); Aaron Evans, Boston, MA (US); Jedidiah Brown, Seattle, WA (US); Elias Sardonis, Cambridge, MA (US)

(73) Assignee: Fuze, Inc., Boston, MA (US)

( * ) Notice: Subject to any disclaimer, the term of this patent is extended or adjusted under 35 U.S.C. 154(b) by 128 days.

(21) Appl. No.: 16/550,703

(22) Filed: Aug. 26, 2019

(51) Int. Cl.
  *H04M 3/523* (2006.01)
  *H04M 3/51* (2006.01)
  *H04M 3/42* (2006.01)
  *H04M 3/428* (2006.01)

(52) U.S. Cl.
  CPC ..... *H04M 3/5232* (2013.01); *H04M 3/42059* (2013.01); *H04M 3/4288* (2013.01)

(58) Field of Classification Search
  CPC .. H04M 3/42059; H04M 3/4288; H04M 3/51; H04M 3/523; H04M 3/5232
  See application file for complete search history.

(56) References Cited

U.S. PATENT DOCUMENTS

| | | | |
|---|---|---|---|
| 2004/0057570 A1* | 3/2004 | Power | H04M 3/5232 379/265.13 |
| 2005/0043986 A1* | 2/2005 | McConnell | H04M 3/5232 379/265.02 |
| 2013/0083915 A1* | 4/2013 | Flockhart | H04M 3/5233 379/265.11 |
| 2020/0007686 A1* | 1/2020 | Keen | H04M 3/5232 |

* cited by examiner

*Primary Examiner* — Harry S Hong
(74) *Attorney, Agent, or Firm* — McDermott Will & Emery LLP

(57) ABSTRACT

Methods and systems for intelligently routing an incoming call are provided. An automatic call distribution system may include a call flow service that receives incoming calls, and a separate weighted-bid call distribution service. The call flow service can request a recommended recipient for each incoming call from the weighted-bid call distribution service. The weighted-bid call distribution service identifies a recommended recipient for each incoming call by generating a priority weight for that call, one or more relevance weights that indicate the relevance of one or more potential recipients to that call, and an availability weight for one or more potential recipients with high relevancy weights. The weighted-bid call distribution service identifies a recommended recipient by comparing a combination of the priority weight for the call and the relevancy weights for the high relevancy recipients to the availability weight for those recipients.

20 Claims, 7 Drawing Sheets

SYSTEMS AND METHODS FOR ROUTING INCOMING CALLS

TECHNICAL FIELD

The present disclosure generally relates to telephony, and more specifically relates to intelligently routing incoming calls.

BACKGROUND

Conventional techniques for automatic call distribution (ACD) route incoming calls to available individuals within an organization, based on user-entered selections to automatic prompts from the ACD system. For example, a caller to a company with an ACD system may be provided with options to select "sales" or "support" by the ACD system. In these systems, individuals in the organization, such as sales team representatives or support team representatives, set their status as either available or unavailable to receive calls. Calls are then routed only to one of the available individuals in a group corresponding to the user's selections. However, the limited information provided by the user responses to pre-set questions, and the binary availability of individuals in conventional systems, can result in inefficient or ineffective routing of the incoming calls by the ACD system.

SUMMARY

The present disclosure provides for systems and methods for a weighted-bid automatic call distribution (ACD) service. The weighted-bid automatic call distribution (ACD) service provides automatic call distribution for routing incoming calls to individuals within an organization. The disclosed systems may be operated to determine a priority weight for each incoming call to an organization such as a company or a call center. The priority weight may be based on data related to the incoming call itself, such as a caller identifier (ID) of a caller. For example, a relatively high priority weight may be assigned to an incoming call from a caller with a caller ID that is associated with a VIP customer.

The disclosed systems may be operated to determine a relevance weight for each of several individuals within the organization. The relevance weight may be determined for each incoming call, based on skills of the individuals and/or data related to that incoming call. For example, when an incoming call from a caller is a call into a support number of the organization, a relatively high relevance weight may be assigned to one or more support members, within the organization, that have handled calls for the caller previously.

The disclosed systems may be operated to determine an availability weight for individuals within the organization. The availability weight for each individual may be determined based on a current state (e.g., Busy, Available, In a Meeting, On a Call) for that individual, at the time of the incoming call. The state may be set by the individual, or automatically determined as described in further detail herein.

In accordance with aspects of the present disclosure, the relevance weight and the availability weight may be taken together and measured against the priority weight to determine a recommended recipient for each incoming call. In this way, the disclosed systems and methods may operate to provide an individual (e.g., the recommended recipient) with an incoming call, even if the individual is not currently "available", given sufficient priority for the call and relevance of the individual. The recommended recipient may be busy with another activity (e.g., on a call or in a meeting), in which case the system may determine whether to attempt to "interrupt" the individual (e.g., based on a combination of the priority, relevance, and availability weights).

In circumstances in which the recommended recipient is currently on another call, and is provided with an attempted interrupt, the recommended recipient may be provided with options to accept or decline the new incoming call, despite the priority of the interrupt for the new call. When an attempted interrupt is declined by the recommended recipient, the ACD system routes the incoming call to a new recommended recipient (e.g., the next highest ranked individual in the organization, based on the determined weights). When an attempted interrupt is accepted, the recommended recipient may elect to "intelligently transfer" their current call to a new recommended recipient by routing the current call back into the weighted-bid ACD, for routing to a next highest ranked recipient for that particular call.

According to some aspects of the present disclosure, an automatic call distribution system is provided that includes a call flow service and a weighted-bid call distribution service. The call flow service is configured to receive an incoming call from a caller; obtain a caller identifier for the caller; and provide a request, including the caller identifier, to the weighted-bid call distribution service for a recommended recipient for the incoming call. The weighted-bid call distribution service is configured to receive the request and the caller identifier from the call flow service; determine an availability weight for at least one potential recipient of the incoming call; identify the recommended recipient based on the availability weight; and return the recommended recipient to the call flow service.

According to other aspects of the present disclosure, a computer-implemented method is provided, the method including receiving, at a weighted-bid service from the call flow service, a request for a recommended recipient for an incoming call received from a caller at the call flow service. The method also includes determining, by the weighted-bid service, a first weight associated with the caller. The method also includes determining, by the weighted-bid service, a second weight associated with at least one potential recipient of the incoming call. The method also includes identifying, by the weighted-bid service, the recommended recipient for the incoming call based on the first weight and the second weight. The method also includes providing the recommended recipient from the weighted-bid service to the call flow service. The method also includes routing the incoming call to a recipient device of the recommended recipient with the call flow service.

According to other aspects of the present disclosure, a non-transitory computer-readable storage medium is provided, including instructions that, when executed by a processor, cause the processor to perform a method for intelligently routing an incoming call, the method including receiving a request for a recommended recipient for an incoming call received from a caller; determining a first weight associated with the caller; determining a second weight associated with at least one potential recipient of the incoming call; identifying the recommended recipient for the incoming call based on the first weight and the second weight; and returning the recommended recipient.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
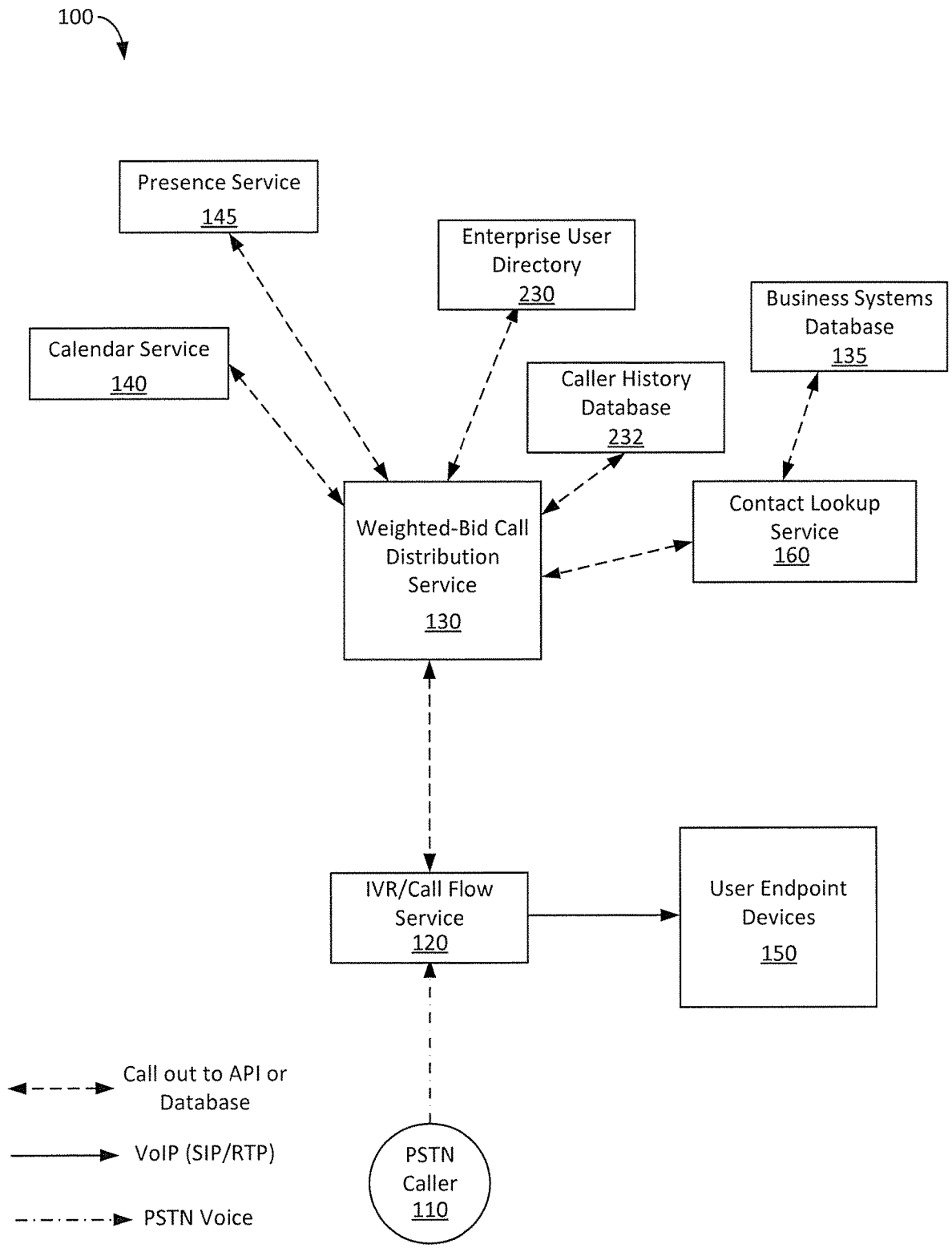
FIG. 1 illustrates an example system for connecting an incoming call from a caller to an endpoint device of a recipient, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not as restrictive.

General Overview

Contact centers and communications platforms that include voice Private Branch Exchange (PBX) functionality often contain automatic call distribution (ACD) services such as queues, ring groups, and hunt groups. These centers and platforms may implement a variety of algorithms for call distribution, such as random assignment algorithms, least recent algorithms, or longest idle algorithms. The algorithms can be combined with "penalties" or "skills" assigned to specific individuals in an organization, in order to optimize routing of incoming calls. However, these systems and methods are very rigid in design.

For example, skills and/or penalties are assigned to individuals upfront, and remain static over the course of all incoming calls. The skills and/or penalties are therefore not dynamically adjusted on a per-call basis, for example, based on data for a recognized caller.

In a similar vein, contact center ACD algorithms commonly rely on individuals to manage their "agent state" which is typically set by the individual to one of three modes, such as Available, Unavailable, and Paused (usually with some sort of "reason" attached for the latter). When "Available", agents are expected to be at the ready and sitting at a terminal or next to a phone to accept an incoming call. This requires dedicated "call center staff" with a coverage schedule. These are generally front-line workers that may not be best suited to handle a particular call, as they may not have the appropriate skills, expertise, or historic knowledge. Very often, the call will need to be subsequently transferred to an appropriate "knowledge worker" by the initial front-line recipient. Therefore, there is a need for improved ACD systems and methods that overcome these deficiencies.

Aspects of the present disclosure address these deficiencies by, for example, providing a calculated "availability weighting" for potential recipients of a call, that allows an organization to extend the scope of individuals handling calls to its knowledge workers. For example, the disclosed systems and methods allow a communications platform to be dynamically aware of stateful information, such as the presence, location, calendar, and/or communications activity of potential recipients of incoming calls. This information can be used in computing the "availability weighting" for the potential recipients. The availability weighting can be used to avoid interrupting an individual at inconvenient times (e.g., when the availability is low due to an ongoing call, an ongoing meeting, or the individual is at a location away from the individual's workstation), unless a priority weighting for the call and a relevance weighting for the individual are high enough to overcome the individual's low "availability".

In addition, the disclosed systems and methods operate to select and/or alert a potential recipient of an incoming call using user presence information, which can help ensure that knowledge workers do not need to be tethered to their workstations to receive a call. This is because the disclosed systems and methods can use the stateful information (e.g., presence, location, calendar, etc., for one or more recommended recipients of an incoming call) to route the call to the right recommended recipient at the right endpoint (e.g., a desk phone, a mobile phone, etc.) at the time of the incoming call.

Additional aspects of the present disclosure may leverage a calendar service of a Unified Communications as a Service (UCaaS) system to provide the ability to integrate with a calendar system of a productivity suite (e.g., GOOGLE DOCS® or MICROSOFT OFFICE) 365®. The calendar service may provide some of the stateful information for determination of an availability weight for one or more potential recipients of an incoming call.

The disclosed system addresses a problem in traditional UCaaS platforms, namely the technical problem of streamlining the process of identifying an appropriate recipient for an incoming call. As described above, conventional routing techniques direct calls to front-line workers, who then often redirect calls to knowledge workers, creating an inefficient use of communications systems resources. The disclosed system solves this technical problem by providing a weighted-bid service that identifies a recommended recipient for each call, based on a priority weight for the call, a relevance weight for one or more potential recipients, and an availability weight for one or more of the potential recipients.

The disclosed subject technology further provides improvements to the functioning of the computer itself because it improves the ability of the computer to connect to recipients, and reduces the cost of resources for routing the calls through multiple stages of recipients (e.g., front-line workers and knowledge workers).

As used herein, the term "interactive voice response (IVR)/call flow service" refers generally to an internet protocol (IP) private branch exchange (PBX) or similar service capable of supporting IVR or call flows. The IVR/call flow service may prompt a user for a preferred language, a requested department, a requested individual, etc., and may be integrated with other components in the disclosed systems.

As used herein, the term "calendar service" refers generally to a service that is responsible for storing and/or managing the scheduling of appointments, meetings, conferences, and collaboration sessions. It may be a calendar/scheduling component internal to a meeting service, some other component of a UCaaS platform, or an adapter service that integrates with a third party calendar service, such as those from the Google and Microsoft productivity suites. Either directly or through an adapter service, it also may provide for the ability of an application program interface (API) client to subscribe to events related to a scheduled meeting, such as scheduled meeting time reached, scheduled end time reached, etc. Events may be notified in the form of a push notification that includes an identifier for a specific calendar item, an owner, start and end times, etc.

As used herein, the term "direct inward dialing number (DID) lookup/contact database service" refers generally to a contact lookup service capable of searching for contact information (e.g., name, company, etc.) based on a DID (e.g., phone number) of a caller. It may take a variety of forms such as, including but not limited to, white pages, an enterprise customer relationship management (CRM), etc. It may also be an adapter or aggregator to multiple services that may return search results. It may also resolve email addresses and/or full names based on caller ID information.

As used herein, the term "enterprise user directory" refers generally to a lookup service of all UCaaS enterprise users that may be searched by associated endpoint identifiers (e.g., session initiation protocol (SIP) credentials). It may be the same service as a DID/contact service or a separate service.

As used herein, the term "presence service" refers generally to a component of a UCaaS platform that may track user state information such as presence states explicitly set by the user (e.g., available, busy, do not disturb (DND), unavailable, etc.) in UCaaS endpoint/collaboration software, and/or presence states triggered by UCaaS platform usage (e.g., in a meeting, on a call, etc.). It may also track a user state through calendar information (e.g., user is a participant in a scheduled meeting, business/working hours, etc.), and user location based on recent activity on specific endpoints, which may be associated with specific physical locations based on IP address and/or e911 registration, as well as GPS data from mobile endpoints. It may also detect that the user is in a moving vehicle and/or driving based on information gathered by a mobile endpoint.

As used herein, the term "handsets" refers generally to UCaaS physical handsets or conferencing hardware connected to a UCaaS platform that may be utilized by audio participants. Handsets may also be utilized for handling audio of a user in conjunction with collaboration software.

Example System for Routing an Incoming Call

FIG. 1 illustrates an example system 100 for routing an incoming call from a caller 110 (e.g., a PSTN caller as in the figure, an enterprise caller, or other caller) to a user endpoint device 150 of a recipient for the call, according to certain aspects of the disclosure. The example of FIG. 1, and other examples described herein, discuss routing of an incoming call, such as a PSTN call. However, it should be appreciated that other forms of omni-channel communications, such as an incoming text or short-message-service (SMS) message, an incoming chat message from a website or application interface, an incoming video call, etc., can be routed to relevant recipients using the weighted-bid systems and methods described herein in connection with incoming calls.

As shown in the example of FIG. 1, system 100 (e.g., an automatic call distribution (ACD) system) may include an interactive voice response (IVR)/call flow service 120, a weighted-bid call distribution service 130 (sometimes referred to herein as weighted-bid distribution service, weighted-bid automatic call distribution service, weighted-bid ACD service, or weighted-bid service), a contact lookup service 160, a calendar service 140, a presence service 145, an enterprise user directory 230, a caller history database 232, and/or a business systems database 135.

IVR/call flow service 120 may be an IP PBX or similar service capable of supporting IVR (interactive voice response) or call flows. IVR/call flow service 120 handles the actual media (e.g., audio) and bridging of the legs (e.g., PSTN and the contact/agent) that ultimately answers the call. Calendar service 140 contains calendar items for the enterprise users, such as availability, working hours, meetings, appointments, or the like. Calendar service 140 may be a calendar component internal to the UCaaS service, and/or can incorporate an adapter service that integrates with a third party calendar service such as those from the Google® and Microsoft® productivity suites. Calendar service 140 may compare a current time to the working hours, meeting times, and appointment times for an enterprise user to determine whether the user is currently in a meeting or appointment or whether the current time is within the working hours of the user. The calendar service can provide a result of the comparison to weighted-bid service 130 or can provide calendar data to weighted-bid service 130 for comparison at the weighted-bid service 130.

Presence service 145 is a component of the UCaaS platform and tracks user state information. The user state information may include presence states explicitly set by the user (e.g., Available, Busy, do not disturb (DND), Unavailable) in UCaaS Endpoint/Collaboration Software, presence states triggered by UCaaS platform usage (e.g., In a Meeting, On a Call, etc.), calendar information (e.g., user is a participant in a scheduled meeting, business/working hours), a user location based on recent activity on specific endpoints (which may be associated to specific physical locations based on IP address and/or e911 registration), and/or based on GPS data from mobile endpoints associated with the user, and/or motion information based on detection of the user being in a moving vehicle and/or driving based on information gathered by the mobile endpoint(s). Presence service 145 may provide a user state to weighted-bid service 130 or can provide presence data to weighted-bid service 130 for state determination at the weighted-bid service 130. Enterprise user directory 230 may be a service of all the UCaaS enterprise users that includes usernames and/or email addresses that can be linked to data in other business systems (e.g., business systems databases 135) and extensions, phone numbers, and/or any other addressing information that may be used to route calls to the individual.

Contact lookup service 160 may be a DID Lookup/Contact Database Service. For example, contact lookup service 160 may be a lookup service capable of searching for contact information (e.g., name, company, etc.) based on the DID (e.g., phone number) of the caller. Contact lookup service 160 can be implemented in a variety of forms such as a digital "white pages", an enterprise CRM, etc. In the example of FIG. 1, contact lookup service 160 is implemented in the form of an adapter or aggregator to multiple enterprise business services (e.g., databases 135 associated with business systems such as CRM, HelpDesk, etc.) that may return search results including caller information associated with the caller of an incoming call. Contact lookup service 160 resolves email addresses and/or full names based on caller ID information as well as related historical information, such as open sales opportunities, open support tickets, etc. As described above, business systems databases 135 may include databases and/or other services for integrated business systems such as CRM, HelpDesk, etc. User endpoint devices 150 may be implemented with end user software (e.g., on a mobile or portable device) or hardware (e.g., desk phones) that enterprise users use to answer the incoming call.

The PSTN caller 110 (e.g., an external caller or an enterprise user calling from off-net) may call a general number of an organization or a direct inward dialing number (DID) dedicated for a portion of the organization.

According to aspects of the disclosure, the PSTN caller 110 dials into an IVR/call flow service 120. For example, the caller 110 may dial in through VoIP (SIP/RTP) or other similar means. IVR/call flow service 120 may then pass the call through any number of menus and/or flows that may optionally prompt the caller for information such as a preferred language, the purpose of their call (e.g., support, sales, etc.), and/or any other inputs deemed relevant by the enterprise for routing calls. This data is collected by IVR/call flow service 120, and may be collectively referred to as "contextual data" for an incoming call.

The IVR/call flow service 120 handling the incoming call may then make an API call to a weighted-bid automated call distribution service 130. In the API call, IVR/call flow service 120 passes caller ID information (e.g., a caller name and/or a caller number), the phone number that was dialed (DNIS) by the caller, and/or any collected "contextual data" to weighted-bid ACD service 130.

The weighted-bid ACD service 130 then identifies and returns a recommended recipient for the incoming call to IVR/call flow service 120. The weighted-bid ACD service 130 may also identify and return a recommended endpoint device 150 at which to reach the recommended recipient.

In order to identify the recommended recipient, weighted-bid ACD service 130 determines a priority weight of the call (e.g., based on data retrieved from the integrated business systems), a relevance weight of one or more enterprise contacts for this particular call (e.g., based on skills relevant to service the call and/or based on previous interactions between the caller and the enterprise users, such as based on data found in the business systems), and/or an availability weight of one or more relevant enterprise contacts for this particular call (e.g., based on presence information, calendar information, location information, etc., for the one or more relevant enterprise contacts). The weighted-bid ACD service 130 may identify a ranked list of recommended recipients for the incoming call based on the priority weight for the call, the relevancy weights, and/or the availability weights, and may provide the highest ranked recommended recipient as the recommended recipient to IVR/call flow service 120.

For example, weighted-bid ACD service 130 may make a call out to the DID Lookup/Contact Database Service 160 with the caller ID information and contextual data. The DID Lookup/Contact Service 160 leverages any available integrated business systems database(s) 135 in an attempt to identify a contact and/or a company related to the caller, as well as any relevant interactions (e.g., support cases, previous calls, open sales opportunities, etc.). Weighted-bid ACD service 130 may obtain relevant interactions from a caller history database 232 that is internal to the enterprise or that is dedicated for storing information for the system 100 (e.g., a data store of interactions between the external contacts and the enterprise users), in some implementations. Weighted-bid ACD service 130 calculates the priority weight for the incoming call based on the identified contact, company, and/or relevant interactions.

Using resolved contact/company information, relevant interactions, and/or contextual call data (e.g., to identify desired skills and/or knowledge of a potential recipient for handling the incoming call), weighted-bid ACD service 130 then looks up relevant users (sometimes referred to herein as potential recipients for the incoming call) from the enterprise user directory 230, and calculates a relevancy weight for each relevant user.

Weighted-bid ACD service 130 may generate a list of relevant enterprise users, ranked using the relevancy weights. Using calendar information from calendar service 140, and/or presence information from presence service 145, weighted-bid ACD service 130 then calculates availability weights for each of the relevant users in the ranked list.

Based on the calculated priority weight, relevancy weights, and availability weights, the weighted-bid ACD service 130 then determines the recommended recipient (e.g., the optimal user or the highest ranked potential recipient) for routing the incoming call. Weighted-bid ACD service 130 then returns the recommended recipient to the IVR/Call Flow Service 120. Weighted-bid ACD service 130 may also use related availability data (e.g., presence data, location data, etc.) for the recommended recipient to determine the optimal endpoint device 150 of the recommended recipient, and provide a recommended endpoint device for the recommended recipient to the IVR/Call Flow Service 120.

IVR/Call Flow Service 120 then dials the recommended recipient on their recommended endpoint device 150.

The weighted-bid ACD service 130 contains a highly configurable rules system such that various enterprises can tailor which data contributes to a priority weighting for an incoming call, and which data contributes to relevance weighting for one or more potential recipients of the call, to suit the particular use cases of that enterprise. Given the many inputs and potentially large number of contacts, weighted-bid automated call distribution service 130 may be implemented in a highly parallel way, making asynchronous calls to other system components (e.g., calendar service 140, presence service 145, enterprise user directory 230, caller history database 232, contact lookup service 160, and/or business systems database 135), and may use strategies such as map reduce to arrive at a short list of potential recipients in a very short amount of time.

Figure 2:
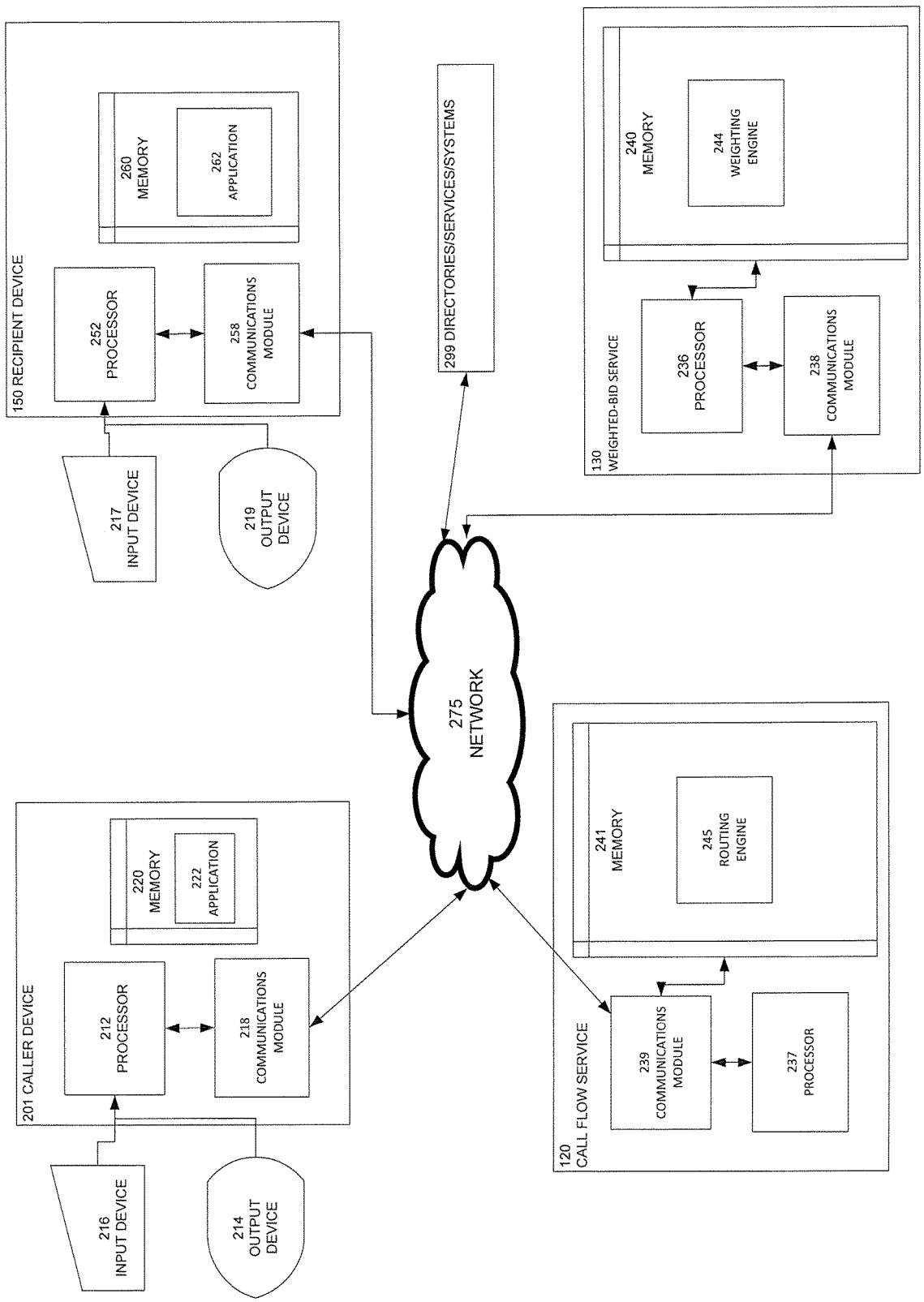
FIG. 2 illustrates further details of various components of FIG. 1, according to certain aspects of the disclosure.

FIG. 2 is a block diagram illustrating an example IVR/call flow service 120, weighted-bid service 130, caller device 201 (of PSTN caller 110), and recipient (user endpoint)

device 150, from the architecture of FIG. 1, according to certain aspects of the disclosure. In the example of FIG. 2, the IVR/call flow service 120, weighted-bid service 130, caller device 201, and recipient (user endpoint) device 150 are connected over the network 275 via respective communications modules 239, 238, 218, and 258. The communications modules 239, 238, 218, and 258 are configured to interface with the network 275 and to receive information, such as data, requests, responses, and commands to other devices on the network. The communications modules 239, 238, 218, and 258 can be, for example, modems, Ethernet cards, and/or other network communications interfaces.

As shown, weighted-bid service 130 includes processor 236, communications module 238, and memory 240, which includes code for a weighting engine 244. The processor 236 of the weighted-bid service 130 is configured to execute instructions, such as instructions physically coded into the processor 236, instructions received from software in memory 240, or a combination of both. For example, the processor 236 of the weighted-bid service 130 executes instructions to receive a request for a recommended recipient of an incoming call, operate weighting engine 244 to generate a priority weight, one or more relevancy weights, and one or more availability weights, and determine the recommended recipient based on the generated priority weight, one or more relevancy weights, and one or more availability weights, and return the recommended recipient.

For example, referring to FIGS. 1 and 2, processor 236 of weighted-bid service 130 may receive a request for a recipient of an incoming call from processor 237 of call flow service 120, via communications modules 239 and 238. The request may be generated by processor 237 responsive to an incoming call, received using communications module 239 from communications module 218 of caller device 201 (e.g., over network 275). Responsive to the request, processor 236 of weighted-bid service 130 operates weighting engine 244 to generate a priority weight for the call, one or more relevancy weights for the call and one or more potential recipients, and one or more availability weights for some or all of the potential recipients. Determining the priority weight, the one or more relevancy weights, and/or the one or more availability weights may include call outs, via network 275 from communications module 238, to one or more of directories/services/systems 299 (e.g., contact lookup service 160, business systems database 135, caller history database 232, enterprise user directory 230, presence service 145, and/or calendar service 140), each of which may also include one or more processors, memories, communications modules, applications, or the like (not explicitly shown in FIG. 2) for storing data, and receiving and responding to requests for the data.

Processor 236 of weighted-bid service 130 may then operate weighting engine 244 to identify one or more recommended recipients (e.g., a single recommended recipient or multiple recommended recipients in a ranked list) for the incoming call, and return the recommended recipient to processor 237, via communications modules 238 and 239. Processor 237 of call flow service 120 operates routing engine 245 (e.g., defined by code stored in memory 241) to route the call to recipient device 150 of the recipient identified by weighting engine 244.

As illustrated in FIG. 2, caller device 201 and recipient device 150 may respectively include processors 212 and 252, memories 220 and 260 storing code for communications applications 222 and 262, input devices 216 and 217 (e.g., physical or virtual keypads or buttons, microphones, or the like), and output devices 214 and 219 (e.g., displays, audio components, tactile components, or the like). The processors 212 and/or 252 may be configured to execute instructions, such as instructions physically coded into the processors, instructions received from software in memory 220 and/or 260 respectively, or a combination of both.

For example, the processor 252 of recipient device 150 may execute client software that interfaces with the integrated communication system hosted on call flow service 120. The client software may establish a communication between recipient device 150 and call flow service 120 using a preferred communication method determined by the integrated communication system of call flow service 120. However, it should also be appreciated that either of caller device 201 or recipient device 150 can be implemented as a simpler device (e.g., without significant memory or processing power) such as a telephone capable only of receiving and/or placing telephone calls using a telephone number.

Although not specifically shown in FIG. 2, other caller devices and recipient devices may also be in communication with call flow service 120 over network 275. The other clients may include components similar or different to those shown in caller devices and recipient devices in FIG. 2.

Figure 3:
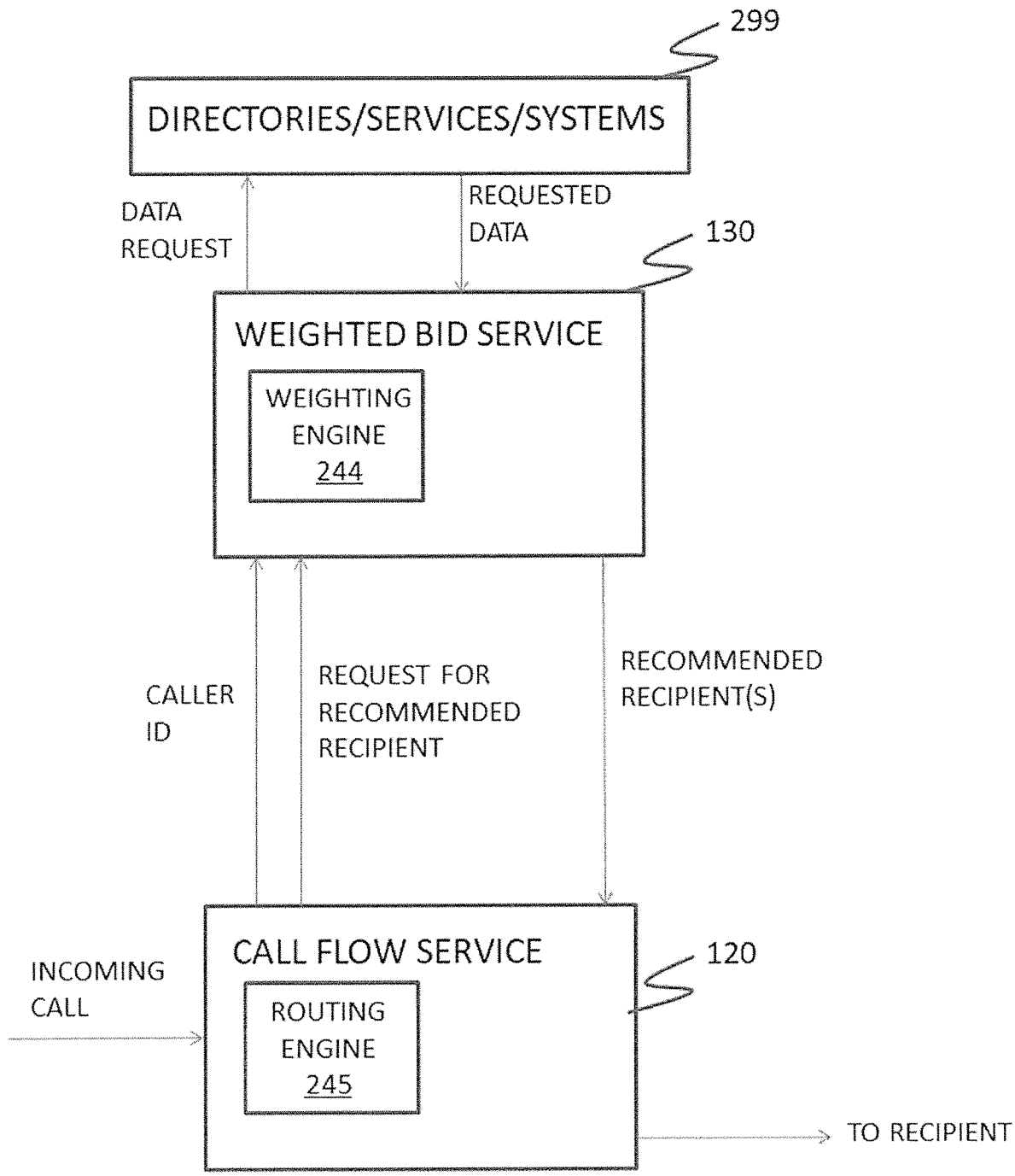
FIG. 3 illustrates an example data exchange during connecting an incoming call from a caller to an endpoint device of a recipient, according to certain aspects of the disclosure.

FIG. 3 illustrates exemplary data exchanges that can occur during routing of an incoming call by system 100. As shown, an incoming call may be received from a caller at call flow service 120. Call flow service 120 may, responsive to receiving the incoming call (or another incoming communication such as an coming text-based communication, video call, or the like), provide a caller identifier (ID) to weighted-bid service 130 along with a request for a recommended recipient for the incoming call. As described herein, in some implementations, prior to providing the request to weighted-bid service 130, call flow service 120 may request additional information (e.g., a purpose for the call, a preferred language, etc.) from the caller, receive the requested additional information (e.g., contextual information) from the caller, and provide the additional information to weighted-bid service 130 along with the caller ID.

In order to generate a priority weight for the incoming call (or text-based communication, video call, etc.), relevancy weights for potential recipients of the incoming call, and availability weights for some or all of the potential recipients, weighted-bid service 130 may then provide one or more data requests to directories/services/systems 299. For example, weighted-bid service 130 may request calendar information for one or more potential recipients from calendar service 140, presence information for one or more potential recipients from presence service 145, enterprise user information (e.g., call history information associated with information associated with a caller) for one or more potential recipients from enterprise user directory 230, caller history information from caller history database 232, and/or contact information for one or more potential recipients and/or one or more persons or other entities associated with the incoming call from contact lookup service 160. The requested data may be returned to weighted-bid service 130 as illustrated. The data requests and resulting data receipts may be performed asynchronously as weighted-bid service 130 progresses toward identifying the one or more recommended recipients.

Using the requested data, and the caller ID and/or additional information (e.g., contextual data) from call flow service 120, weighting engine 244 generates the priority weight for the call (or text-based communication, video call, etc.), the relevancy weights for one or more potential recipients of the call (or text-based communication, video call, etc.), and availability weights for one or more of the potential recipients (e.g., potential recipients with relatively higher relevancy weights than other potential recipients). Weighting engine 244 and/or other processing circuitry of weighted-bid service 130 then returns one or more recommended recipients to call flow service 120, as illustrated in FIG. 3. As shown, call flow service 120 may then route the call (or text-based communication, video call, etc.) to the highest weighted recommended recipient.

In circumstances in which the highest weighted recommended recipient is not immediately available (e.g., on another call, in a meeting, or away from the office), call flow service 120 may determine whether to interrupt the highest weighted recommended recipient based on a comparison of the priority weight and the relevancy weight with the availability weight of the highest weighted relevancy recipient.

For example, the priority weight for an incoming call may increase as more information about the contact that's calling is obtained. For example, if the caller is identified as a prior caller, and directories/services/systems 299 indicate that there is a sales force opportunity for the caller, the priority weight may be increased (e.g., relative to the priority weight for a first time caller). If, for example, directories/services/systems 299 indicate that the caller has previously spoken with the same potential recipient more than once before, the relevancy weight for that potential recipient may be increased relative to other potential recipients that have spoken with the caller once or never spoken with the caller. Similarly, the relevancy weight can be increased for potential recipients with relevant knowledge based on the contextual data, regardless of prior call history. This may be helpful to intelligently route a call from a previous caller with a new issue not relevant to the previous recipient (for example).

On the potential recipient side, weighting engine 244 generates an availability weight that is separate from information about the incoming call. For example, a potential recipient may have an availability weight of one if the potential recipient has self-designated as "currently available" or have a relatively lower weight if they are currently on a call with a low priority or low relevance caller, a further relatively lower weight if they are currently in a meeting, a further relatively lower weight if they are currently on a call with a high priority or high relevancy caller, a further relatively lower availability weight if they have self-designated as do not disturb, and an availability weight of zero if they cannot be located on the network (as illustrative examples).

However, based on a comparison of the priority weight and the relevancy weight on one side, and the availability weight on the other side, the potential recipient may be contacted (e.g., interrupted) even if they have a low current availability weight. For example, when a potential recipient is on a call with a current caller, the potential recipient may only be interrupted for a relatively high priority incoming caller with a relatively high relevancy.

In order to perform the comparison of the priority weight and the relevancy weight on one side, and the availability weight on the other side, the priority weight, the relevancy weight, and the availability weight for a particular incoming call and a particular potential recipient can be combined (e.g., added) and the resulting combination compared to a threshold. The potential recipient may then be interrupted if the combination exceeds the threshold. For example, if the priority weight, the relevancy weight, and the availability weight can each vary between values of zero and one, the threshold may be set to 1.5 (for example). In this way, any combination of these weights that exceeds 1.5 will result in the potential recipient receiving the incoming call, and any combination of these weights that is equal to or less than 1.5 will prevent the potential recipient from being interrupted. For example, a lowest priority weight of zero, a moderate relevancy weight of 0.6, and a full availability weight of 1.0 (total 1.6) will cause the call to be routed to the potential recipient. In this example, a moderate priority weight of 0.5, a moderate relevancy weight of 0.6, and a moderate availability weight of 0.5 (total 1.6) will cause the call to be routed to the potential recipient. In this example, a highest priority weight of 1.0, and a highest relevancy weight of 1.0 can overcome an extremely low availability weight of 0.1 (total 2.1) to cause the call to be routed to the potential recipient. Of course it should be appreciated that these exemplary combinations, thresholds, and values are merely illustrative and other combinations of the weights, other forms of comparisons (e.g., ratios, weighted sums, etc.), and/or other thresholds (e.g., static or dynamic thresholds) can be used to determine whether the combination of the priority of the call/caller and the relevancy of the call/caller to the potential recipient should outweigh the potential recipient's current level of unavailability.

Even when it is determined that a potential recipient should be interrupted, the interrupted recipient may still be provided with an option to reject the incoming call (e.g., to remain with the current caller) or to intelligently reroute the current caller and accept the incoming call. In the circumstance in which the incoming call is rejected, call flow service 120 requests a new recommended recipient or obtains a next highest weighted recommended recipient of multiple recommended recipients previously received, and routes the incoming call to the new or next highest weighted recommended recipient using the same procedures. In the circumstance in which the incoming call is accepted, call flow service 120 requests a new recommended recipient for the prior (current) call, and routes the prior (current) call to the new recommended recipient for that call using the same procedures.

It should be appreciated that the techniques described herein may be implemented as method(s) that are performed by physical computing device(s), as one or more non-transitory computer-readable storage media storing instructions (e.g., stored sequences of instructions) which, when executed by computing device(s), cause performance of the method(s), or, as physical computing device(s) that are specially configured with a combination of hardware and software that causes performance of the method(s).

Figure 4:
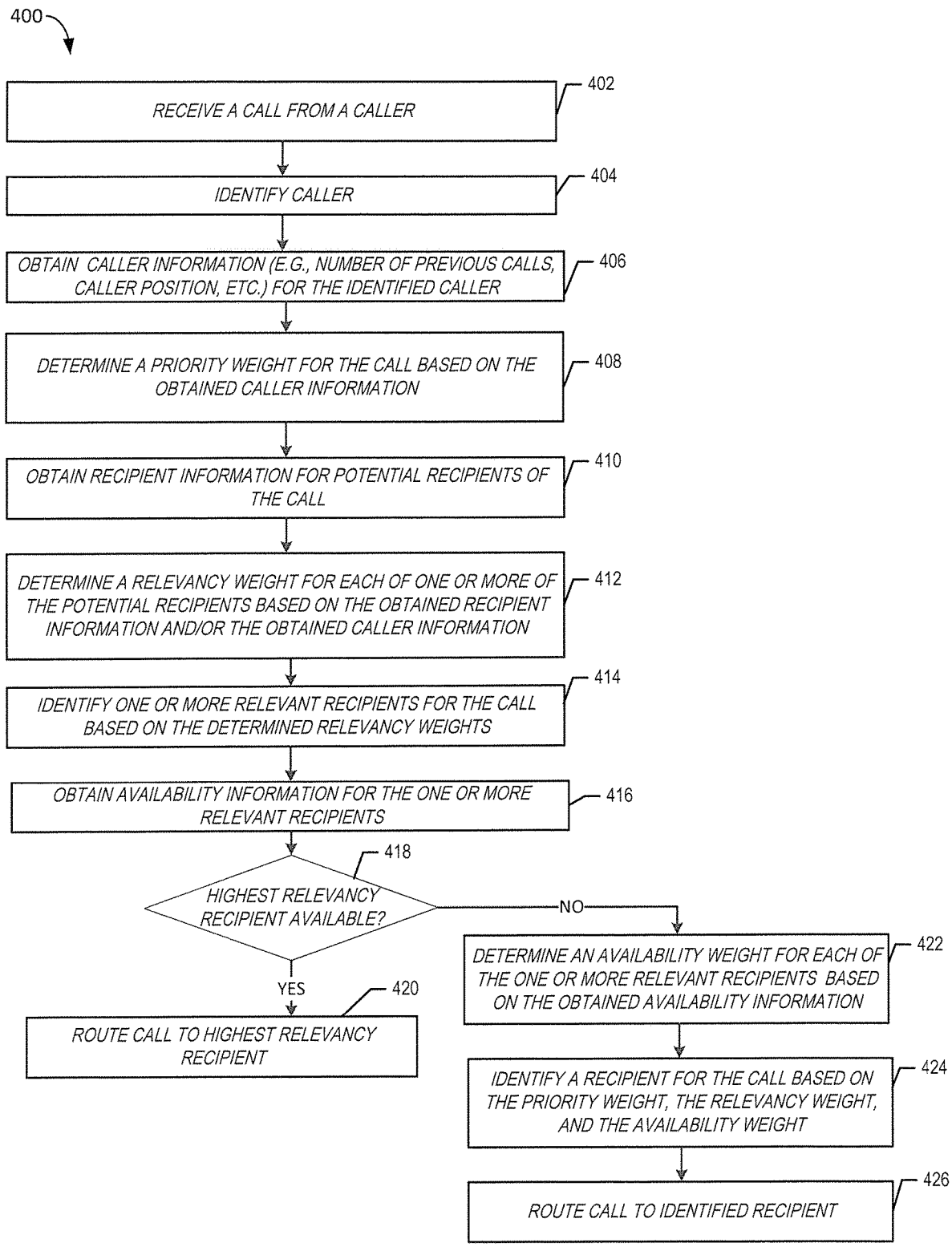
FIG. 4 illustrates an example flow diagram for connecting an incoming call from a caller to an endpoint device of a recipient, according to certain aspects of the disclosure.

FIG. 4 illustrates an example process 400 for intelligently routing an incoming call, according to certain aspects of the disclosure. For explanatory purposes, the example process 400 is described herein with reference to the system 100 of FIG. 1, including, for example, call flow service 120, weighted-bid service 130, calendar service 140, presence service 145, enterprise user directory 230, caller history database 232, contact lookup service 160, business systems database(s) 135, and/or user endpoint device 150. Further for explanatory purposes, the example process 400 is described herein with reference to an incoming "call", though the process can also be applied to intelligently route other forms of incoming omni-channel communications as described herein, including text messages, chat messages from a web or application interface, video calls, or the like. Further for explanatory purposes, the blocks of the example process 400 are described herein as occurring in serial, or linearly. However, multiple blocks or sub-operations within blocks of the example process 400 may occur in parallel. In addition, the blocks of the example process 400 need not be performed in the order shown and/or one or more of the blocks of the example process 400 need not be performed.

At block 402, an incoming call, such as a call from PSTN caller 110 of FIG. 1, may be received (e.g., at IVR/call flow service 120). In one suitable example, responsive to receiving the call, the IVR/call flow service 120 may request a recommended recipient for the incoming call from weighted-bid service 130.

At block 404, the caller of the incoming call may be identified. The caller may be identified by the IVR/call flow service 120 and/or by weighted-bid service 130. Identifying the caller may include receiving a caller ID with the incoming call and/or providing a call out to contact lookup service 160 to obtain identifying information associated with the caller and/or one or more other callers or entities (e.g., a company) associated with the caller.

At block 406, caller information (e.g., information associated with the caller that has been obtained as contextual data at the time of the call by IVR/call flow service 120 and/or stored caller information such as a number of previous calls by the caller, the caller's position in a company, etc., from directories/services/systems 299) is obtained.

At block 408, a priority weight for the incoming call is determined based on the caller ID and/or the obtained caller information. For example, a relatively higher priority weight may be determined if the caller is identified as the CEO of a company, than if the caller is unidentified. As another example, a relatively higher priority weight may be determined if the caller has previously called several times regarding sales, than if the caller is a first time caller.

At block 410, recipient information for one or more potential recipients of the incoming call may be obtained. The potential recipients may be enterprise users such as front-line workers, knowledge workers, executives, or the like. The recipient information may include calendar information obtained from calendar service 140, presence information obtained from presence service 145, user knowledge information or other user information from enterprise user directory 230, history information between the user and the caller from caller history database 232, and/or other information associated with the potential recipients from contact lookup service 160 and/or business systems database(s) 135.

At block 412, a relevancy weight for each of one or more of the potential recipients is determined based on the recipient information and/or the obtained caller information. For example, the relevancy weight may be determined to be relatively higher for a potential recipient that has previously interacted with the caller (as determined based on the obtained user information and caller information) than for a potential recipient with no history with the caller. As another example, the relevancy weight may be determined to be relatively higher for a potential recipient that is fluent in the caller's preferred language (as determined based on the contextual information obtained by IVR/call flow service 120 and the user information) than for a user that does not speak that language. In this way, the relevancy of one or more potential recipients to the specific incoming call and associated caller is determined.

At block 414, one or more relevant recipients for the incoming call are identified based on the determined relevancy weights. For example, the relevant recipients may be the potential recipients with the five highest relevancy weights, or all potential recipients with a relevancy weight over a relevancy threshold (as examples).

At block 416, availability information for the one or more relevant recipients may be obtained. The availability information may include calendar information obtained from calendar service 140, presence information obtained from presence service 145, location information obtained from GPS data from a recipient device 150 and/or determined based on the calendar and/or presence information, and/or motion information (e.g., information indicating whether the user is in a moving vehicle) obtained from GPS data from a recipient device 150 and/or determined based on the calendar and/or presence information.

At block 418, weighted-bid service 130 and/or IVR/call flow service 120 may determine whether the highest relevancy recipient (the relevant recipient with the highest availability weight) is currently available. For example, the highest relevancy recipient may be currently available if the presence information indicates that user has set their state to "available" or indicates that the current time is within the working hours of the user, the user is not on a call or in a meeting, and the user is present at an endpoint device connected to the network. If the highest relevancy recipient is currently available, that user may be identified as the recommended recipient for the incoming call. The recommended recipient may be returned to IVR/call flow service 120 from weighted-bid service 130 and, at block 420, IVR/call flow service routes the call to that user.

However, if the highest relevancy recipient is not currently available (e.g., that user is on a call, in a meeting, away from the office, etc.), at block 422, an availability weight for each of the relevant recipients (including the highest relevancy recipient) is determined, based on the obtained availability information. For example, the availability weight of a relevant recipient may be relatively higher if the relevant recipient is not on a call than if that relevant recipient is on a call. As another example, the availability weight of a relevant recipient may be relatively higher if the relevant recipient is on a call with a low priority or low relevancy caller than if that relevant recipient is on a call with a relatively higher priority or higher relevancy caller. As another example, the availability weight of a relevant recipient may be relatively higher if the relevant recipient is in the office than if that relevant recipient is at home. As another example, the availability weight of a relevant recipient may be relatively higher if the relevant recipient is at home during work hours than if that relevant recipient is in a moving vehicle after work hours.

At block 424, based on the priority weight for the incoming call, the relevancy weights of the relevant recipients, and the availability weights of the relevant recipients, weighted-bid service 130 may identify a recommended recipient. For example, weighted-bid service 130 may identify the highest relevancy recipient as the recommended recipient if the highest relevance recipient has an availability weight that is outweighed by the priority and relevancy weights, as described herein. However, if the highest relevancy recipient has an availability weight that is too low to be outweighed by the priority and relevancy weights, the next most relevant recipient (the relevant recipient with the next highest relevancy weight) may be identified as the recommended recipient. When the recommended recipient is identified by weighted-bid service 130, weighted-bid service 130 returns the recommended recipient to IVR/call flow service 120 and, at block 426, IVR/call flow service 120 routes the call to the identified recommended recipient. If the recommended recipient is not currently available, the call can be routed to the recommended recipient with an interrupt message and/or options to accept or reject the incoming call.

Figure 5:
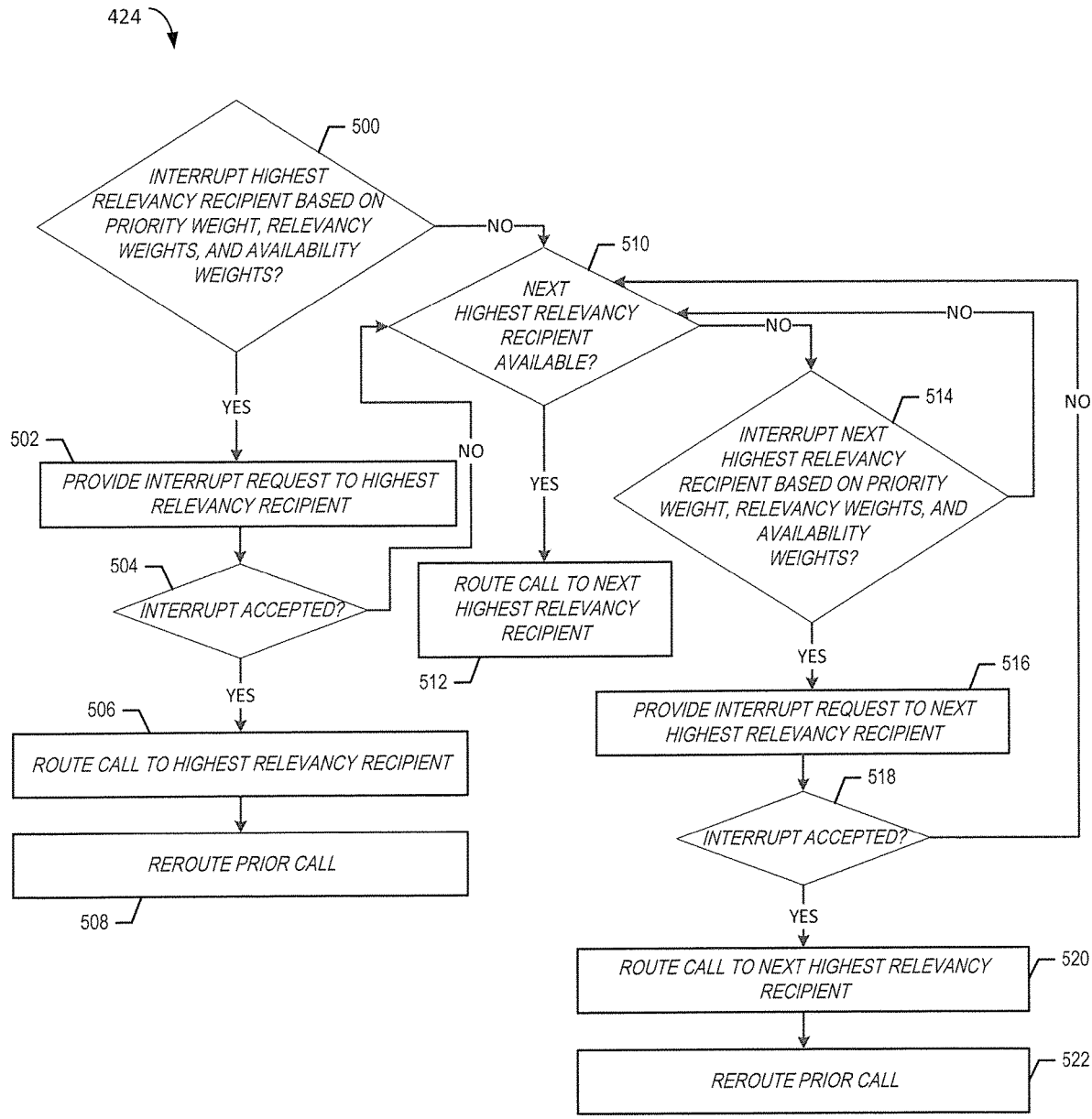
FIG. 5 illustrates an example flow diagram for connecting an incoming call from a caller to an endpoint device of a recipient when a recommended recipient is unavailable, according to certain aspects of the disclosure.

FIG. 5 illustrates further details of the operations that may be performed for identifying the recommended recipient of the incoming call at block 424 of FIG. 4, according to certain aspects of the disclosure. For explanatory purposes, the example operations of block 424 are described herein with reference to the system 100 of FIG. 1, including, for example, call flow service 120, weighted-bid service 130, calendar service 140, presence service 145, enterprise user directory 230, caller history database 232, contact lookup service 160, business systems database(s) 135, and/or user endpoint device 150. Further for explanatory purposes, operations of block 424 are described herein as occurring in serial, or linearly. However, multiple operations or sub-operations within operations of block 424 may occur in parallel. In addition, the operations of block 424 need not be performed in the order shown and/or one or more of the operations of block 424 need not be performed.

At block 500, based on the priority weight for the incoming call, the relevancy weight of the highest relevancy recipient, and the availability weight of the highest relevancy recipient, weighted-bid service 130 and/or IVR/call flow service 120 determines whether to interrupt the highest relevancy recipient (e.g., whether the availability weight of the highest relevancy recipient is outweighed by the priority weight of the call and the relevancy weight of the highest relevancy recipient, such as whether a combination of the weights exceeds a threshold as described herein).

If it is determined, at block 500, that the highest relevancy recipient should be interrupted, at block 502, an interrupt request is provided by IVR/call flow service 120 to the highest relevancy recipient. The interrupt request may include a notification to the highest relevancy recipient that a higher priority or higher relevancy call is incoming, and may include options to accept or reject the incoming call.

At block 504, IVR/call flow service 120 receives a response from the highest relevancy recipient indicating whether the interrupt is accepted. If the interrupt request is accepted at block 504, at block 506, the incoming call is routed, by IVR/call flow service 120, to the highest relevancy recipient. At block 508, if the highest relevancy recipient was on a prior call when the interrupt request was accepted, system 100 reroutes the prior call (e.g., by identifying a new highest relevancy recipient for that prior call using weighted-bid service 130, and rerouting that prior call to the new highest relevancy recipient for that prior call).

If, at block 504, the interrupt request is rejected, at block 510, weighted-bid service 130 and/or IVR/call flow service 120 may determine whether the next highest relevancy recipient (e.g., the relevant recipient having the next highest relevancy weight for the incoming call) is currently available (e.g., based on the presence information and/or the availability weight for that next highest relevancy recipient). If it is determined, at block 510, that the next highest relevancy recipient is available, IVR/call flow service 120 routes the incoming call to the next highest relevancy recipient.

If at block 510, it is determined that the next highest relevancy recipient is not currently available (e.g., due to presence information indicating the next highest relevancy recipient is on a call or in a meeting, or due to an availability score less than a highest value), at block 514, weighted-bid service 130 and/or IVR/call flow service 120 determines whether to interrupt the next highest relevancy recipient (e.g., based on the priority weight for the incoming call, the relevancy weight of the next highest relevancy recipient, and the availability weight of the next highest relevancy recipient). Weighted-bid service 130 and/or IVR/call flow service 120 determines whether to interrupt the highest relevancy recipient by determining whether the availability weight of the next highest relevancy recipient is outweighed by the priority weight of the call and the relevancy weight of the next highest relevancy recipient, such as whether a combination of the weights exceeds a threshold as described herein.

If it is determined, at block 514, that the next highest relevancy recipient should be interrupted, at block 516, an interrupt request is provided by IVR/call flow service 120 to the next highest relevancy recipient. The interrupt request may include a notification to the next highest relevancy recipient that a higher priority or higher relevancy call is incoming, and options to accept or reject the incoming call.

At block 518, IVR/call flow service 120 receives a response from the next highest relevancy recipient indicating whether the interrupt is accepted. If the interrupt request is accepted at block 518, at block 520, the incoming call is routed, by IVR/call flow service 120, to the next highest relevancy recipient. At block 522, if the next highest relevancy recipient was on a prior call when the interrupt request was accepted, system 100 reroutes the prior call (e.g., by identifying a new highest relevancy recipient for that prior call using weighted-bid service 130, and rerouting that prior call to the new highest relevancy recipient for that prior call).

If, at block 518, the interrupt request is rejected, IVR/call flow service may return to block 510 at repeat the operations of blocks 510, 512, 514, 516, and/or 518 until a recommended recipient is identified.

In various examples, the operations of block 500, 510, and 514 may be performed by IVR/call flow service 120 stepping through a ranked list of relevant recipients with associated availability scores provided by weighted-bid service 130, or by repeated requests from IVR/call flow service 120 for a new recommended recipient when it is determined by the IVR/call flow service 120 that a last recommended recipient is unavailable. In yet another example, the operations of blocks 500, 510, and 514 can be performed internally at weighted-bid service 130 prior to providing a recommended recipient to IVR/call flow service 120.

Figure 6:
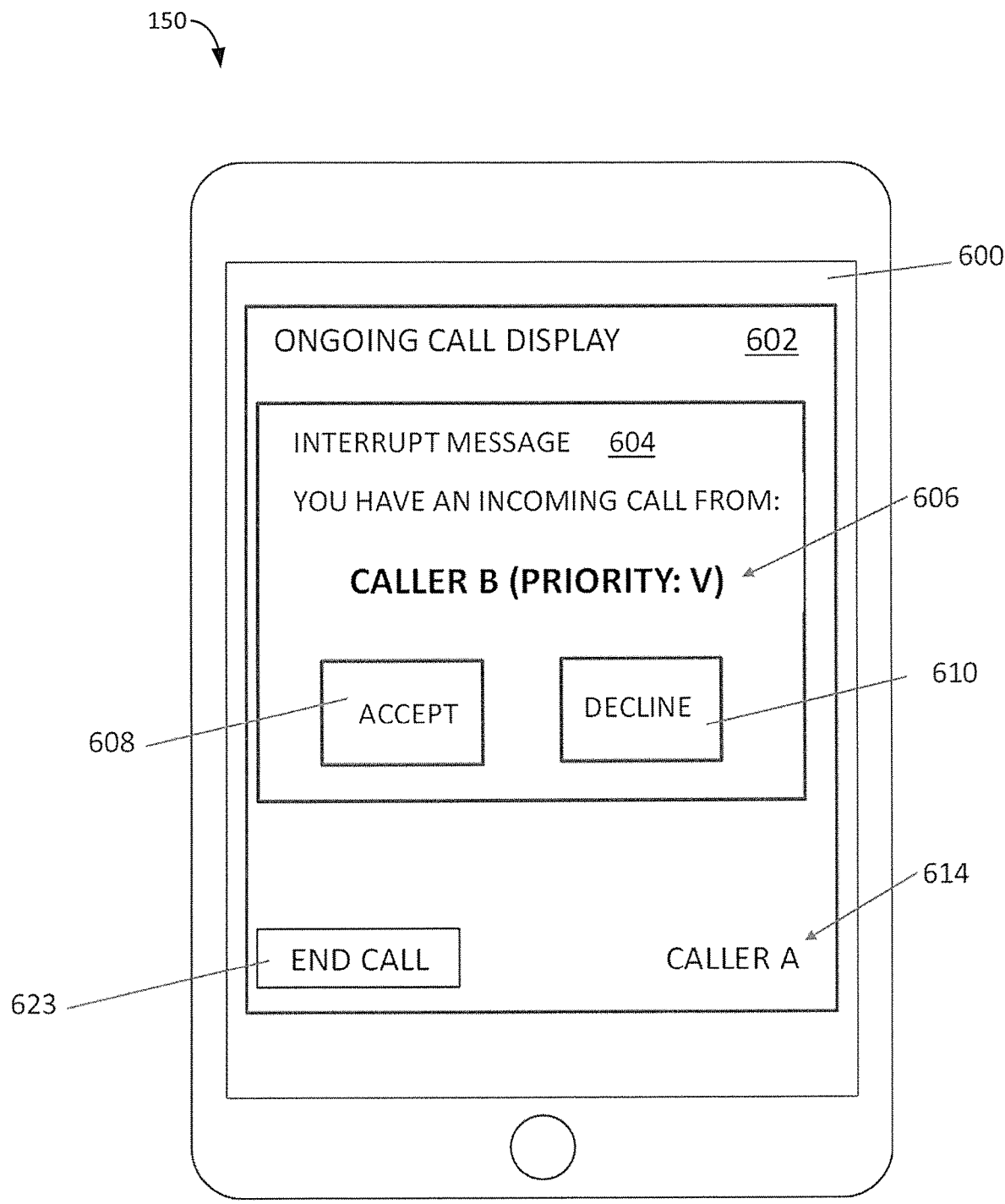
FIG. 6 illustrates an example user interface view of an endpoint device of a recommended recipient of an incoming call, according to certain aspects of the disclosure.

FIG. 6 illustrates a user interface view of a user endpoint device 150 of a recommended recipient that is on a current (ongoing) call and receives an interrupt request from IVR/call flow service 120 for a new incoming call (e.g., because an availability weight for the recommended recipient was outweighed by the priority weight and/or the relevancy weight of the incoming call).

As shown, a user of user endpoint device 150 may view an ongoing call display 602 on a display 600 of the device 150. The ongoing call display may include an identifier 614 of the current caller, and one or more control options such as a virtual button 623 that can be selected to end the ongoing call.

In a scenario in which the relevancy and priority weights for a new incoming call/recipient pair lead to a case where the new call is presented to the user despite the user not being currently available (e.g., the user is on the ongoing call), an interrupt message 604 may be displayed overlaying some or all of the ongoing call display.

As shown in the example of FIG. 6, the interrupt message 604 (displayed by device 150 responsive to an interrupt request from IVR/call flow service 120) may include an identifier 606 of the caller name and priority level (e.g., "caller B" and "Priority: V" in the example of FIG. 6), and selectable options 608 and 610 to accept or decline the new incoming call (and thereby accept or decline the interrupt request). In this way, the recommended recipient for the incoming call is provided with information sufficient to determine whether to accept or decline the new incoming call, and end the ongoing call.

In some operational scenarios, despite the priority of the interrupt message 604 for the new call, the user of device 150 may decline the new call, in which case the IVR/call flow service 120 (e.g., at block 510) again leverages the weighted-bid ACD service 130 to route the new call to the next highest relevancy recipient. For example, a next API call can contain flag information indicating that the previously recommended individual declined the interrupt request. The weighted-bid ACD service 130 may implement result caching of the ranked relevant recipients in order to avoid having to repeat previous calculations.

In other operational scenarios, the user of device 150 may select option 608 to accept the new incoming call. Selecting option 608 may cause device 150 to provide an indication from that the interrupt request is accepted, and to instruct IVR/call flow service 120 to intelligently transfer the current ongoing call (e.g., by routing the ongoing call back to IVR/call flow service 120 and weighted-bid service 130 to route that call to new most relevant and available recipient for that call).

Hardware Overview

Figure 7:
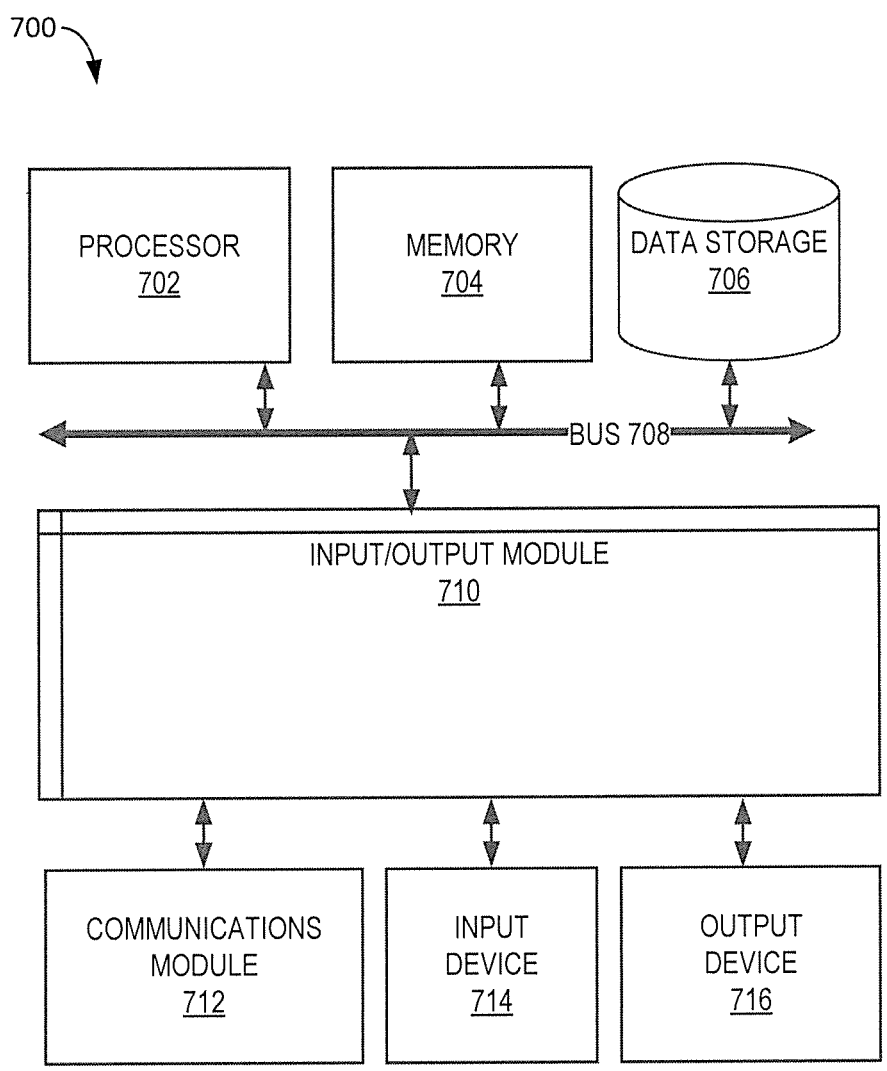
FIG. 7 is a block diagram illustrating an example computer system with which aspects of the subject technology can be implemented.

FIG. 7 is a block diagram illustrating an example computer system 700 with which various components of the system 100 of FIG. 1 may be implemented. In certain aspects, the computer system 700 may be implemented using hardware or a combination of software and hardware, either in a dedicated server, or integrated into another entity, or distributed across multiple entities.

Computer system 700 (e.g., IVR/call flow service 120, weighted-bid call distribution service 130, contact lookup service 160, calendar service 140, presence service 145, enterprise user directory 230, caller history database 232, business systems database 135, or endpoint user device 150) includes a bus 708 or other communication mechanism for communicating information, and a processor 702 coupled with bus 708 for processing information. According to one aspect, the computer system 700 can be a cloud computing server of an IaaS that is able to support PaaS and SaaS services. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 700 may be implemented with one or more processors 702. The processor 702 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In-Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in memory 704 and implemented in one or more computer program products, e.g., one or more modules of computer program instructions encoded on a computer-readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, wired communication in some implementations, or wireless communication in other implementations, and multiple interfaces may also be used. The input/output module 710 is configured to connect to a communications module 712. Example communications modules 712 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications module 712 can be, for example, modems or Ethernet cards.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic, or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link, and communications module 712. In the Internet example, a server might transmit a requested code for an application program through the Internet, the ISP, the local network, and communications module 712. The received code may be executed by processor 702 as it is received, and/or stored in data storage 706 for later execution.

In certain aspects, the input/output module 710 is configured to connect to a plurality of devices, such as an input device 714 and/or an output device 716. Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 716 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 716 may comprise appropriate circuitry for driving the output device 716 to present graphical and other information to a user.

According to one aspect of the present disclosure, components of the system 100 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. Processor 702 may process the executable instructions and/or data structures by remotely accessing the computer program product, for example by downloading the executable instructions and/or data structures from a remote server through communications module 712 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 702 for execution. The term "storage medium" as used herein refers to any non-transitory computer-readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 708. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms "display" or "displaying" means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An automatic call distribution system, comprising:
   a call flow service; and
   a weighted-bid call distribution service, wherein:
   the call flow service is configured to:
     receive an incoming call from a caller,
     obtain a caller identifier for the caller, and
     provide a request, including the caller identifier, to the weighted-bid call distribution service for a recommended recipient for the incoming call, and wherein the weighted-bid call distribution service is configured to:
     receive the request and the caller identifier from the call flow service,
     determine an availability weight for at least one potential recipient of the incoming call,
     identify the recommended recipient based on the availability weight,
     provide an interrupt request to the recommended recipient when the recommended recipient is currently on another call, and
     return the recommended recipient to the call flow service when the recommended recipient accepts the interrupt request.

2. The automatic call distribution system of claim 1, wherein the call flow service is further configured to route the incoming call to the recommended recipient.

3. The automatic call distribution system of claim 2, wherein the weighted-bid call distribution service is further configured to identify a recommended endpoint device for the recommended recipient at a time of the incoming call, and provide the recommended endpoint device to the call flow service.

4. The automatic call distribution system of claim 3, wherein the call flow service is further configured to route the incoming call to the recommended recipient at the recommended endpoint device.

5. The automatic call distribution system of claim 1, wherein the weighted-bid call distribution service is further configured to:
   determine a priority weight for the incoming call, based on the caller identifier;
   determine a relevancy weight for each of a plurality of potential recipients, including the at least one potential recipient of the incoming call;
   identify one or more relevant recipients based on the relevancy weights, the one or more relevant recipients including the at least one potential recipient of the incoming call;
   determine an availability weight for each of the one or more relevant recipients; and
   identify the recommended recipient based on the availability weights for the one or more relevant recipients, the relevancy weights for the one or more relevant recipients, and the priority weight for the incoming call.

6. The automatic call distribution system of claim 5, wherein the weighted-bid call distribution service is configured to determine the priority weight for the incoming call, at least in part by:
   providing a request, including the caller identifier, to a contact lookup service for information associated with the caller; and
   determining the priority weight for the incoming call based on the information associated with the caller.

7. The automatic call distribution system of claim 6, wherein the weighted-bid call distribution service is configured to determine the relevancy weight for each of the plurality of potential recipients at least in part, by:

providing a request, to an enterprise user directory, for enterprise user information for each of the plurality of potential recipients; and determining the relevancy weight for each of the plurality of potential recipients based on the enterprise user information.

8. The automatic call distribution system of claim 7, wherein the enterprise user information includes prior call history information associated with the information associated with the caller.

9. The automatic call distribution system of claim 7, wherein the weighted-bid call distribution service is configured to determine the availability weight for each of the relevant recipients at least in part by:

providing a request, to a calendar service, for calendar information for each of the one or more relevant recipients; and determining the availability weight for each of the one or more relevant recipients based on the calendar information for that relevant recipient.

10. The automatic call distribution system of claim 7, wherein the weighted-bid call distribution service is configured to determine the availability weight for each of the one or more relevant recipients, at least in part, by:

providing a request, to a presence service, for presence information for each of the one or more relevant recipients; and determining the availability weight for each of the one or more relevant recipients based on the presence information for that relevant recipient.

11. The automatic call distribution system of claim 5, wherein the call flow service is further configured to provide the interrupt request to the recommended recipient, when the priority weight for the incoming call and the relevance weight for the recommended recipient outweigh the availability weight of the recommended recipient.

12. A computer-implemented method, comprising:

receiving, at a weighted-bid service from call flow service, a request for a recommended recipient for an incoming call received from a caller at the call flow service;

determining, by the weighted-bid service, a first weight associated with the caller;

determining, by the weighted-bid service, a second weight associated with a potential recipient of the incoming call;

identifying, by the weighted-bid service, the recommended recipient for the incoming call based on the first weight and the second weight;

providing the recommended recipient from the weighted-bid service to the call flow service;

providing an interrupt request to the recommended recipient when the recommended recipient is currently on another call; and routing the incoming call to a recipient device of the recommended recipient with the call flow service when the recommended recipient accepts the interrupt request.

13. The computer-implemented method of claim 12, wherein the first weight is a priority weight that is based on caller information associated with the caller, and the second weight is a relevancy weight that indicates a relevance of the potential recipient to the incoming call.

14. The computer-implemented method of claim 12, further comprising determining a third weight associated with the potential recipient of the incoming call, wherein identifying the recommended recipient for the incoming call based on the first weight and the second weight comprises identifying the recommended recipient for the incoming call based on the first weight, the second weight, and the third weight.

15. The computer-implemented method of claim 14, wherein identifying the recommended recipient for the incoming call based on the first weight, the second weight, and the third weight comprises comparing the third weight to a combination of the first and second weights for each of the potential recipient.

16. The computer-implemented method of claim 15, wherein the third weight for each of the potential recipient is an availability weight that indicates an availability of the potential recipient.

17. The computer-implemented method of claim 15, further comprising:

determining that the potential recipient is not currently available;

determining, based on the comparing, that the potential recipient is not to be interrupted; and identifying a second potential recipient as the recommended recipient.

18. The computer-implemented method of claim 17, further comprising:

determining that the recommended recipient is on a current call;

determining, based on the comparing, that the recommended recipient should be interrupted; and providing an interrupt request to the recommended recipient.

19. The computer-implemented method of claim 18, further comprising:

receiving an indication from the recipient device of the recommended recipient that the interrupt request is accepted;

routing the incoming call to the recipient device of the recommended recipient; and requesting, from the weighted-bid service, a new recommended recipient for the current call.

20. A non-transitory computer-readable storage medium including instructions that, when executed by a processor, cause the processor to perform a method for intelligently routing an incoming call, the method comprising:

receiving a request for a recommended recipient for an incoming call received from a caller;

determining a first weight associated with the caller;

determining a second weight associated with at least one potential recipient of the incoming call;

identifying the recommended recipient for the incoming call based on the first weight and the second weight;

providing an interrupt request to the recommended recipient when the recommended recipient is currently on another call; and returning the recommended recipient to a call flow service when the recommended recipient accepts the interrupt request.

* * * * *